(12) United States Patent
Qiao et al.

(10) Patent No.: US 10,652,142 B2
(45) Date of Patent: May 12, 2020

(54) SDN-BASED ARP IMPLEMENTATION METHOD AND APPARATUS

(71) Applicant: HUAWEI TECHNOLOGIES CO., LTD., Shenzhen (CN)

(72) Inventors: Xiaoqiang Qiao, Shenzhen (CN); Yan Li, Beijing (CN); Hui Ni, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/873,895

(22) Filed: Jan. 17, 2018

(65) Prior Publication Data
US 2018/0167313 A1 Jun. 14, 2018

Related U.S. Application Data

(63) Continuation of application No. PCT/CN2015/085215, filed on Jul. 27, 2015.

(51) Int. Cl.
H04L 12/721 (2013.01)
H04L 29/12 (2006.01)
(Continued)

(52) U.S. Cl.
CPC .............. H04L 45/32 (2013.01); H04L 45/64 (2013.01); H04L 45/745 (2013.01);
(Continued)

(58) Field of Classification Search
CPC ....... H04L 45/42; H04L 45/745; H04L 49/25; H04L 61/00; H04L 61/10; H04L 61/103
See application file for complete search history.

(56) References Cited

U.S. PATENT DOCUMENTS 10,142,160 B1   11/2018   Adams et al.
2014/0019639 A1   1/2014   Ueno
(Continued)

FOREIGN PATENT DOCUMENTS

CN   102938794 A   2/2013
CN   103460653 A   12/2013
(Continued)

OTHER PUBLICATIONS

Victor Boteanu et al.,"University of Amsterdam Graduate School of Informatics System and Network Engineering Minimizing ARP traffic in the AMS-IX switching platform using OpenFlow",Aug. 25, 2013,total 30 pages.
(Continued)

Primary Examiner — Pao Sinkantarakorn
Assistant Examiner — Pawaris Sinkantarakorn
(74) Attorney, Agent, or Firm — Kilpatrick Townsend & Stockton LLP

(57) ABSTRACT

Embodiments of the present disclosure disclose an SDN-based ARP implementation method and apparatus. The method includes: receiving, by a controller, an ARP request sent by a first switch, and when it is determined that no ARP entry corresponding to the ARP request exists locally, sending, to the first switch, an instruction configured to instruct the first switch to flood the ARP request. In this way, the ARP request can be broadcast to an entire network by means of message forwarding between switches.

13 Claims, 15 Drawing Sheets

(51) Int. Cl.
  *H04L 12/715* (2013.01)
  *H04L 12/741* (2013.01)
(52) U.S. Cl.
  CPC ........ *H04L 61/103* (2013.01); *H04L 61/6022* (2013.01); *H04L 61/6009* (2013.01)

(56) References Cited

U.S. PATENT DOCUMENTS

| | | | |
|---|---|---|---|
| 2015/0071289 A1* | 3/2015 | Shin | H04L 45/745 |
| | | | 370/392 |
| 2015/0109923 A1* | 4/2015 | Hwang | H04L 47/12 |
| | | | 370/235 |
| 2015/0195201 A1 | 7/2015 | Li et al. | |
| 2015/0200910 A1 | 7/2015 | Yamada | |
| 2015/0281067 A1 | 10/2015 | Wu | |
| 2016/0285820 A1 | 9/2016 | Tan et al. | |

FOREIGN PATENT DOCUMENTS

| | | |
|---|---|---|
| CN | 103812779 A | 5/2014 |
| JP | 2014531158 A | 11/2014 |
| JP | 2015133556 A | 7/2015 |
| KR | 20150030099 A | 3/2015 |
| WO | 2014115157 A1 | 7/2014 |
| WO | 2015085576 A1 | 6/2015 |
| WO | 2015100656 A1 | 7/2015 |

OTHER PUBLICATIONS

Victor Boteanu et al.,"Minimizing ARP traffic in the AMS-IX switching platform using OpenFlow",University of Amsterdam Graduate School of Informatics System and Network Engineering,Aug. 25, 2013,total 29 pages.

\* cited by examiner

SDN-BASED ARP IMPLEMENTATION METHOD AND APPARATUS

CROSS-REFERENCE TO RELATED APPLICATIONS

This application is a continuation of International Application No. PCT/CN2015/085215, filed on Jul. 27, 2015, the disclosure of which is hereby incorporated by reference in its entirety.

TECHNICAL FIELD

The present disclosure relates to the field of data communications technologies, and in particular, to a software defined networking (SDN)-based Address Resolution Protocol (ARP) implementation method and apparatus.

BACKGROUND

SDN is a new network architecture and is widely applied to a data center network and a telecommunications network. As shown in FIG. 1, the SDN decouples a control logic of a network element from a forwarding function of the network element. A control layer provides a network service. The network service is implemented by delivering a corresponding policy by the control layer to a network device. The network device is configured to transmit a packet at a forwarding layer. The network service includes various network services and applications, such as routing, multicast, quality of service, and access control.

An OpenFlow protocol is a typical technology in an SDN network. According to the OpenFlow protocol, a OpenFlow controller (OF Controller for short hereinafter) implements a function of a control layer, and several OpenFlow switches (OF Switch for short hereinafter) are used as forwarding-layer network devices to implement a function of the forwarding layer. Each switch may be connected to several hosts.

The OF controller is responsible for determining an action of a service flow according to a packet characteristic. The packet characteristic includes an Internet Protocol (IP) quintuple, an Ethernet frame header, a virtual local area network identification (VLAN ID), and the like. In addition, the OF controller delivers a flow table rule to the OF switches. The OF switches obtain and store the flow table rule, and perform a corresponding action on a subsequent packet that meets the flow table rule, so as to forward or process the packet.

As shown in FIG. 2, a basic process of delivering a flow table rule is as follows.

Step 201: An OF controller sends a flow table rule to an OF switch by using an OFP_Flow_Mod message (that is, a flow table modification message).

The OF controller may deliver flow table rules of different flow tables to the OF switch by using multiple OFP_Flow_Mod messages.

Step 202: The OF switch stores all flow table rules and corresponding forwarding action sets into corresponding flow tables.

Step 203: When receiving a packet sent by a user, the OF switch performs flow table matching for the received packet, and performs corresponding forwarding processing on the received packet according to a matched flow table rule and a corresponding forwarding action set thereof.

As shown in FIG. 3, a process of flow table matching and forwarding processing is as follows.

When a packet is input to a switch by using an ingress port, matching starts from the first flow table, Table 0. If a corresponding flow table rule is matched, an instruction in the flow table rule is executed, and matching proceeds to a next flow table, Table 1, according to the instruction. When matching is performed on Table 1 for the packet, the packet carries ingress port information and metadata information. Metadata is a value of a maskable register and is used to transfer information between flow tables. If an instruction in a matched flow table rule in Table 1 does not instruct to go to a next flow table, matching ends, and a corresponding action set corresponding to the matched flow table rule in Table 1 is executed. If no corresponding flow table rule is matched in a flow table for the packet, the packet is discarded or forwarded to the OF controller for processing. For example, the OF controller forwards the packet to a designated output port, discards the packet, modifies a packet header, or forwards the packet according to a group table.

In an Ethernet Protocol, if a source host needs to communicate with a destination host, the source host has to know a MAC address of the destination host. However, the source host usually knows only an IP address of the destination host. A basic function of the ARP is to query for and obtain the MAC address of the destination host by using the IP address of the destination host. As shown in FIG. 4, a process of implementing, based on the ARP, communication between hosts is as follows.

Step 401: Before sending a packet to a host B, a host A checks whether a locally cached ARP mapping table has an ARP entry of the host B. If the locally cached ARP mapping table has the ARP entry of the host B, the host A directly sends the packet to the host B according to the ARP entry; or if the locally cached ARP mapping table does not have the ARP entry of the host B, step 402 is executed.

Step 402: The host A sends an ARP request message to an entire network by using a connected switch S1.

In actual application, the host A sends the ARP request message to the connected switch S1, and the switch S1 broadcasts the ARP request message to the entire network.

Step 403: After receiving the ARP request, the host B adds an ARP entry of the host A to the host B.

Step 404: The host B sends an ARP response to the host A in a unicast manner by using a connected switch S2.

Specifically, the switch S2 obtains MAC address information of the host A by using the received ARP request message, and may send the ARP response to the host A in a unicast manner according to the MAC address information of the host A.

Step 405: After receiving the ARP response, the host A adds the ARP entry of the host B.

In a subsequent communication process with the host B, a packet can be sent to the host B according to the ARP entry.

It can be learned that, broadcast of the ARP request message consumes plenty of network bandwidth. In a network architecture using the SDN, to reduce a quantity of times for broadcasting an ARP request message, an OF controller is configured to store ARP mapping tables of an entire network and process all ARP requests.

As shown in FIG. 5, an existing ARP implementation method is as follows.

501: A host A sends an ARP request message to a connected switch OF switch S1.

502: The OF switch S1 encapsulates the ARP request message into a packet-in message and sends the packet-in message to a controller OF controller.

503: The OF controller receives the packet-in message, and searches an internal ARP mapping table for an ARP entry of a host B. If the ARP entry of the host B is found, the OF controller directly generates an ARP response, encapsulates the ARP response into a packet-out message, and returns the packet-out message to the OF switch S1; or if no ARP entry of the host B is found, the OF controller stores an ARP entry of the host A, and instructs, in a manner of a packet-out message, all OF switches to send the ARP request to connected hosts.

504: A switch OF switch S3 forwards the ARP request to the host B.

505: The host B returns an ARP response.

506: The OF switch S3 encapsulates the ARP response into a packet-in message and sends the packet-in message to the OF controller.

507: The OF controller receives the packet-in message, stores the ARP entry of the host B, encapsulates the ARP response into a packet-out message, and sends the packet-out message to the OF switch S1.

508: The OF switch S1 then forwards the ARP response to the host A.

After receiving the ARP response, the host A adds the ARP entry of the host B. In a subsequent communication process, the host A can send a packet to the host B according to the ARP entry.

According to an existing SDN-based ARP implementation method, maintaining all ARP mapping tables together by using an OF controller reduces a quantity of times for broadcasting an ARP request message. However, with expansion of a network scale and an increase in ARP requests, transmitting a packet-out message to many switches by using a centralized controller (that is, the OF controller) not only results in great control processing load on the controller, but also occupies more transmission resources of the controller. As a result, the controller becomes a processing bottleneck.

SUMMARY

Embodiments of the present disclosure provide an SDN-based ARP implementation method and apparatus, so as to resolve a prior-art problem that broadcasting an ARP request based on a controller results in relatively heavy load on the controller and a waste of many transmission resources of the controller.

According to a first aspect, an SDN-based ARP implementation method is provided, including:

receiving, by a controller, a first ARP request sent by a first switch, where the first ARP request is sent to the first switch by a host that is connected to the first switch; and when determining that an ARP entry corresponding to the first ARP request does not exist locally, sending, by the controller to the first switch, a first instruction configured to instruct the first switch to flood the first ARP request.

With reference to the first aspect, in a first possible implementation of the first aspect, the first instruction is configured to instruct the first switch to send the first ARP request to both a switch that is adjacent to the first switch and the host that is connected to the first switch.

With reference to either the first aspect or the first possible implementation of the first aspect, in a second possible implementation of the first aspect, before the receiving, by a controller, a first ARP request sent by a first switch, the method further includes:

configuring, by the controller, a preset flow table rule for the first switch, where the flow table rule includes that when receiving an ARP request sent by an adjacent switch, a switch floods the ARP request sent by the adjacent switch.

With reference to any one of the first aspect, or the first to the second possible implementations of the first aspect, in a third possible implementation of the first aspect, after the sending, to the first switch, a first instruction, the method further includes:

receiving a first ARP response, forwarding the first ARP response to the first switch, and locally storing an ARP entry in the first ARP response.

With reference to any one of the first aspect or the first to the third possible implementations of the first aspect, in a fourth possible implementation of the first aspect, if determining that the ARP entry corresponding to the first ARP request exists locally, determining, by the controller, a destination switch based on the ARP entry, and sending the first ARP request to the destination switch.

With reference to the fourth possible implementation of the first aspect, in a fifth possible implementation of the first aspect, after the sending, by the controller, the first ARP request to the destination switch, the method further includes:

if a second ARP response returned by the destination switch is received, forwarding the second ARP response to the first switch; or if an ARP response returned by the destination switch is not received in specified duration, deleting the ARP entry corresponding to the first ARP request and that is stored locally, and sending, to the first switch, a second instruction configured to instruct the first switch to flood the first ARP request, where the second instruction is configured to instruct the first switch to send the first ARP request to both the switch that is adjacent to the first switch and the host that is connected to the first switch.

With reference to the fifth possible implementation of the first aspect, in a sixth possible implementation of the first aspect, after the sending, to the first switch, a second instruction, the method further includes:

when receiving a third ARP response sent by a second switch, locally storing an ARP entry included in the third ARP response; and forwarding the third ARP response to the first switch.

According to a second aspect, another SDN-based ARP implementation method is provided, including:

receiving, by a first switch, a first ARP request sent by a host that is connected to the first switch;

reporting, by the first switch, the first ARP request to a controller;

receiving, by the first switch, an instruction configured to instruct the first switch to flood the first ARP request and that is delivered by the controller according to the first ARP request; and flooding, by the first switch, the first ARP request according to the instruction.

With reference to the second aspect, in a first possible implementation of the second aspect, the flooding, by the first switch, the first ARP request according to the instruction specifically includes:

sending, by the first switch according to the instruction, the first ARP request to both a switch that is adjacent to the first switch and the host that is connected to the first switch.

With reference to the second aspect or the first possible implementation of the second aspect, in a second possible implementation of the second aspect, before the receiving, by a first switch, a first ARP request sent by a host that is connected to the first switch, the method further includes:

performing, by the first switch, configuration on a flow table rule according to a flow table rule configuration command delivered by the controller, where the flow table rule includes that when receiving an ARP request sent by an adjacent switch, a switch floods the ARP request sent by the adjacent switch.

According to a third aspect, another SDN-based ARP implementation method is provided, including:

receiving, by a first switch, a first ARP request sent by a second switch that is adjacent to the first switch; and directly flooding, by the first switch, the first ARP request.

With reference to the third aspect, in a first possible implementation of the third aspect, the directly flooding, by the first switch, the first ARP request specifically includes:

sending, by the first switch, the first ARP request to a switch that is different from the second switch and that is adjacent to the first switch, and the host that is connected to the first switch.

With reference to the third aspect or the first possible implementation of the third aspect, in a second possible implementation of the third aspect, before the receiving, by a first switch, a first ARP request sent by a second switch that is adjacent to the first switch, the method further includes:

performing, by the first switch, configuration on a flow table rule according to a flow table rule configuration command delivered by a controller, where the flow table rule includes that when receiving an ARP request sent by an adjacent switch, a switch floods the ARP request sent by the adjacent switch, and when receiving an ARP request sent by a connected host, the switch reports, to the controller, the ARP request sent by the connected host.

According to a fourth aspect, a controller is provided, including a transceiver, a processor, a memory, and a bus, where the transceiver, the processor, and the memory are connected to the bus, the memory stores a set of programs, and the processor is configured to invoke the programs stored in the memory, so that the controller executes the method according to any one of the first aspect, or the first to the sixth possible implementations of the first aspect.

According to an fifth aspect, a switch is provided, including a transceiver, a processor, a memory, and a bus, where the transceiver, the processor, and the memory are connected to the bus, the memory stores a set of programs, and the processor is configured to invoke the programs stored in the memory, so that the switch executes the method according to any one of the second aspect, or the first to the second possible implementations of the second aspect.

According to a sixth aspect, a switch is provided, including a transceiver, a processor, a memory, and a bus, where the transceiver, the processor, and the memory are connected to the bus, the memory stores a set of programs, and the processor is configured to invoke the programs stored in the memory, so that the switch executes the method according to any one of the third aspect, or the first to the second possible implementations of the third aspect.

In the embodiments of the present disclosure, when the ARP entry corresponding to the first ARP request exists locally, the controller sends the first ARP request to the destination switch in a unicast manner; and if an ARP response is received, feeds back the ARP response to the first switch in a unicast manner, so that the first switch further feeds back the ARP response to a source host; or if no ARP response is received in specified duration, locally deletes the corresponding ARP entry, and broadcasts the first ARP request by means of message forwarding between switches, so as to obtain a correct MAC address that is of a destination host and corresponding to a destination IP address in the first ARP request, and locally update the ARP entry. In this way, an ARP table stored by the controller can be updated in a timely manner, avoiding a more serious network error caused by an invalid ARP entry stored by the controller.

DESCRIPTION OF EMBODIMENTS

Considering that, in an SDN network structure, a spanning Tree Protocol can be well implemented to avoid a broadcast storm, according to the embodiments of the present disclosure, an ARP request is broadcast by using an interaction message between switches. This method replaces a prior-art method in which an ARP request is broadcast to an entire network by using a packet-out event of a controller. An amount of times for which a packet-out message is sent by the controller is reduced, and in comparison with that the controller sends the packet-out message, fewer transmission resources are occupied for message interaction between switches. Therefore, transmission resources occupied by the controller for broadcasting an ARP request are reduced, and a problem that the controller becomes a processing bottleneck due to relatively heavy load is avoided.

To make the objectives, technical solutions, and advantages of the present disclosure clearer, the following further describes the present disclosure in detail with reference to the accompanying drawings. Apparently, the described embodiments are merely a part rather than all of the embodiments in accordance with the present disclosure. All other embodiments obtained by persons of ordinary skill in the art based on the embodiments of the present disclosure without undue experiment shall fall within the protection scope of the present disclosure.

Figure 1:
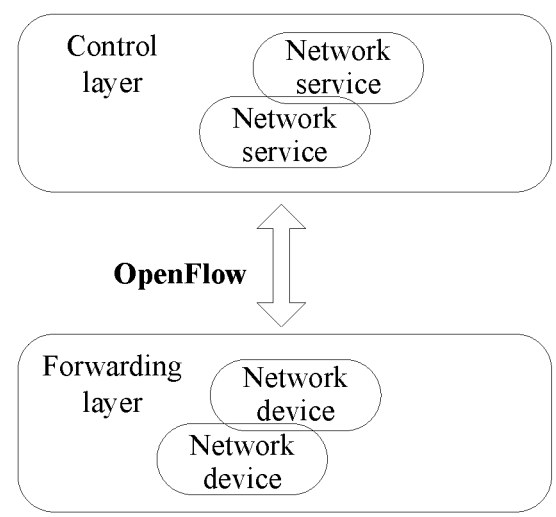
FIG. 1 is a basic architecture diagram of SDN in the prior art.
Figure 2:
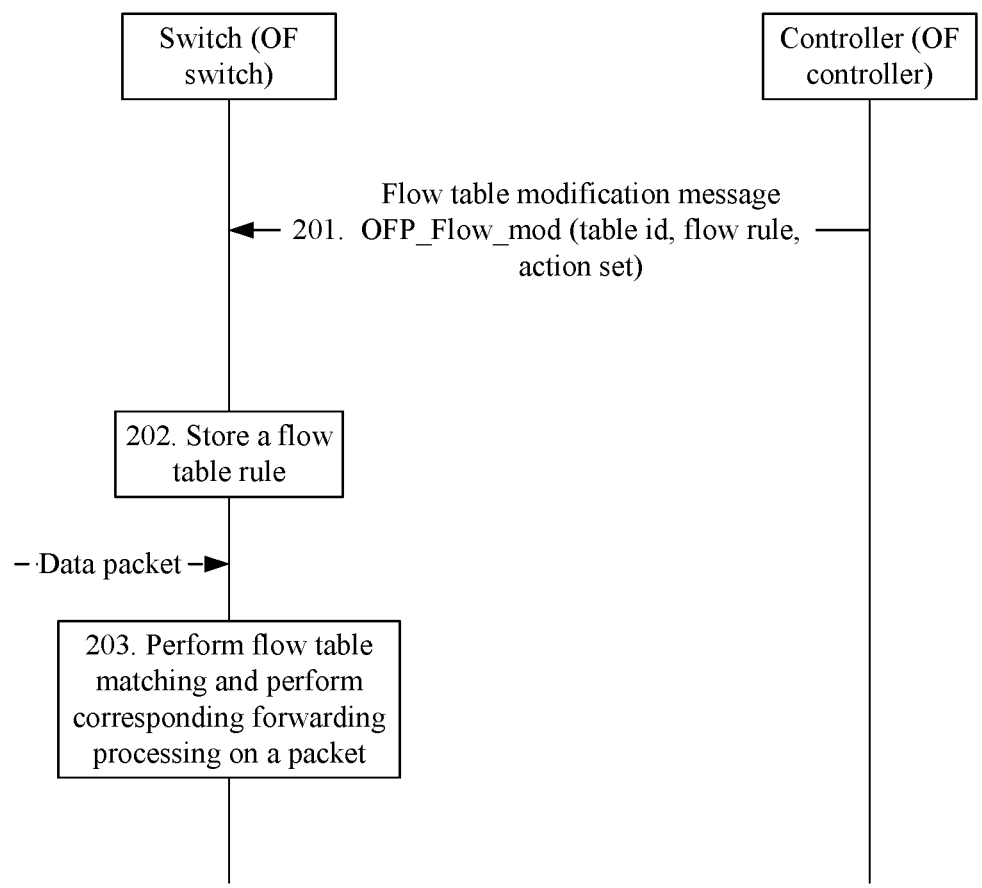
FIG. 2 is a basic flowchart for delivering a flow table rule in the prior art.
Figure 3:
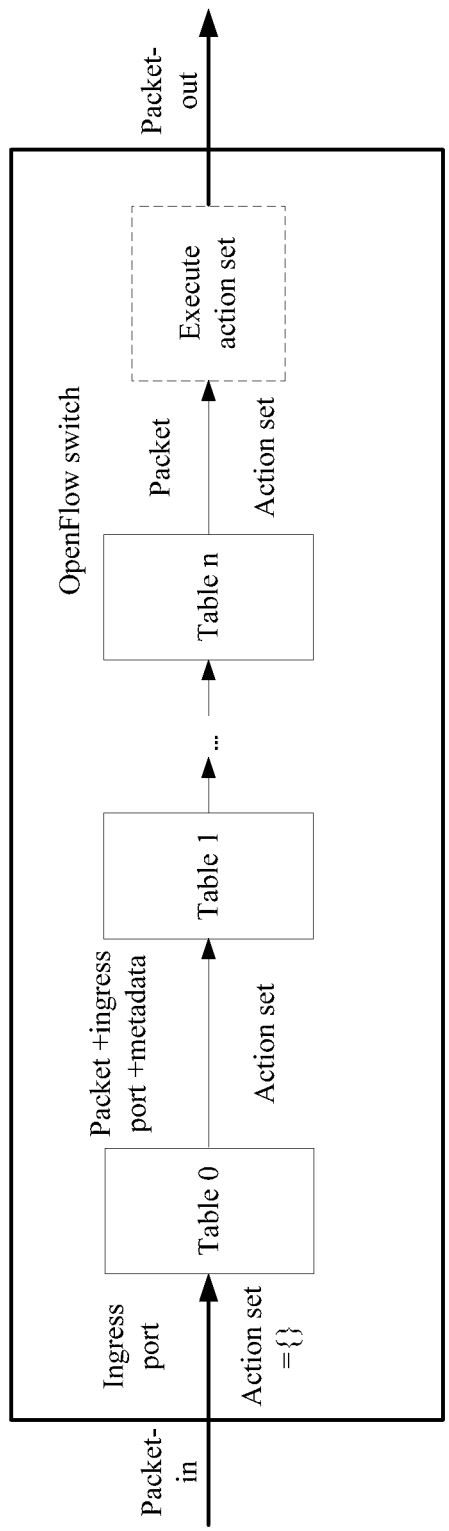
FIG. 3 is a flowchart of flow table matching and processing in the prior art.
Figure 4:
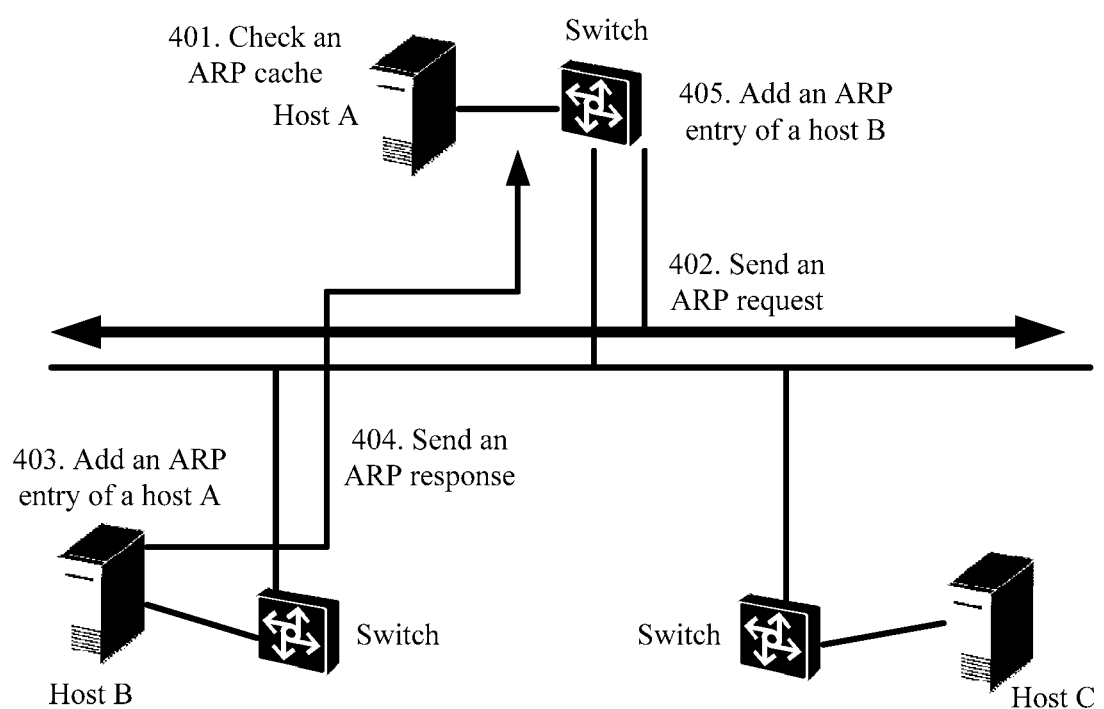
FIG. 4 is a flowchart for implementing communication between hosts based on the ARP in the prior art.
Figure 5:
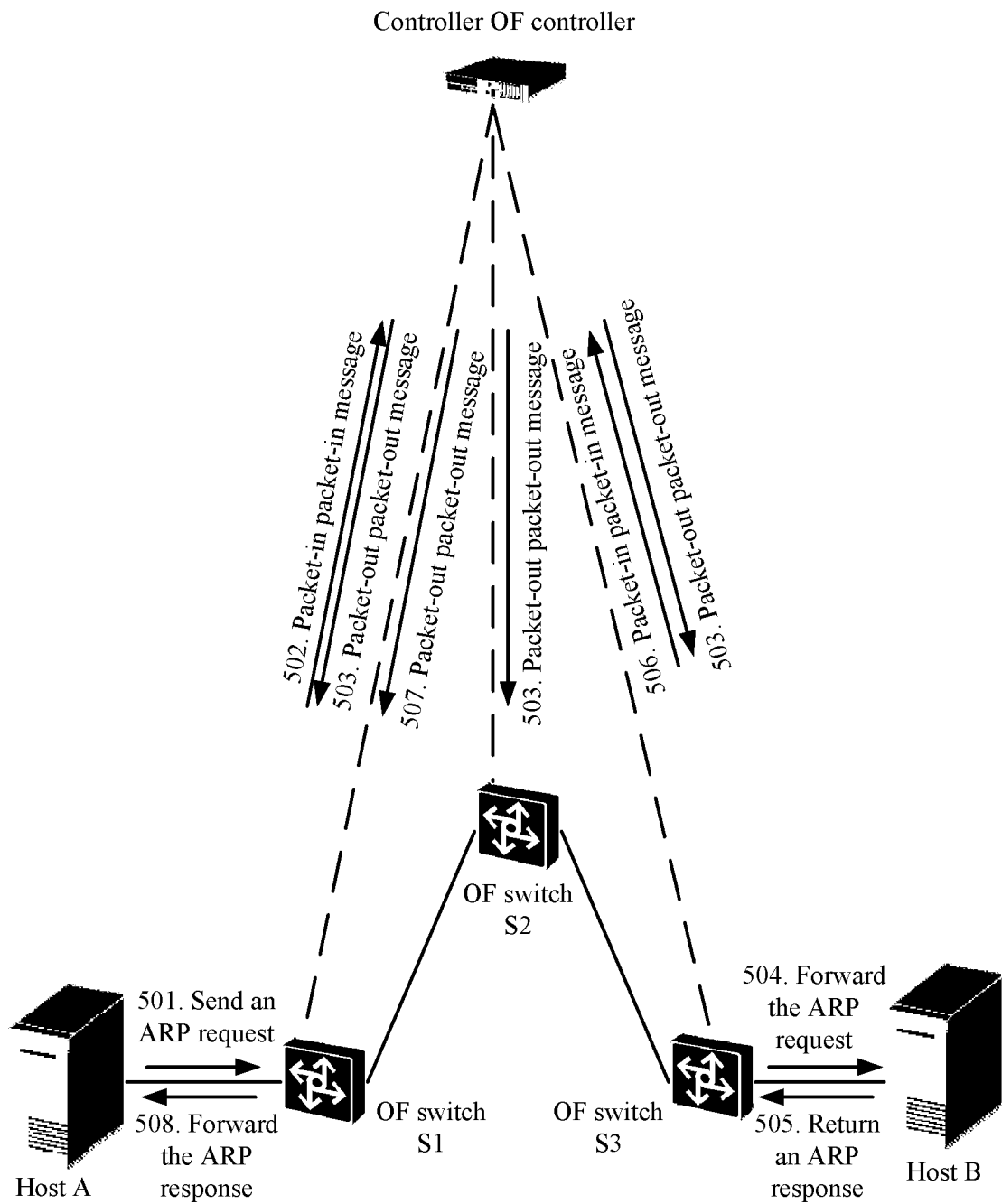
FIG. 5 is a flowchart of an ARP implementation method in the prior art.
Figure 6:
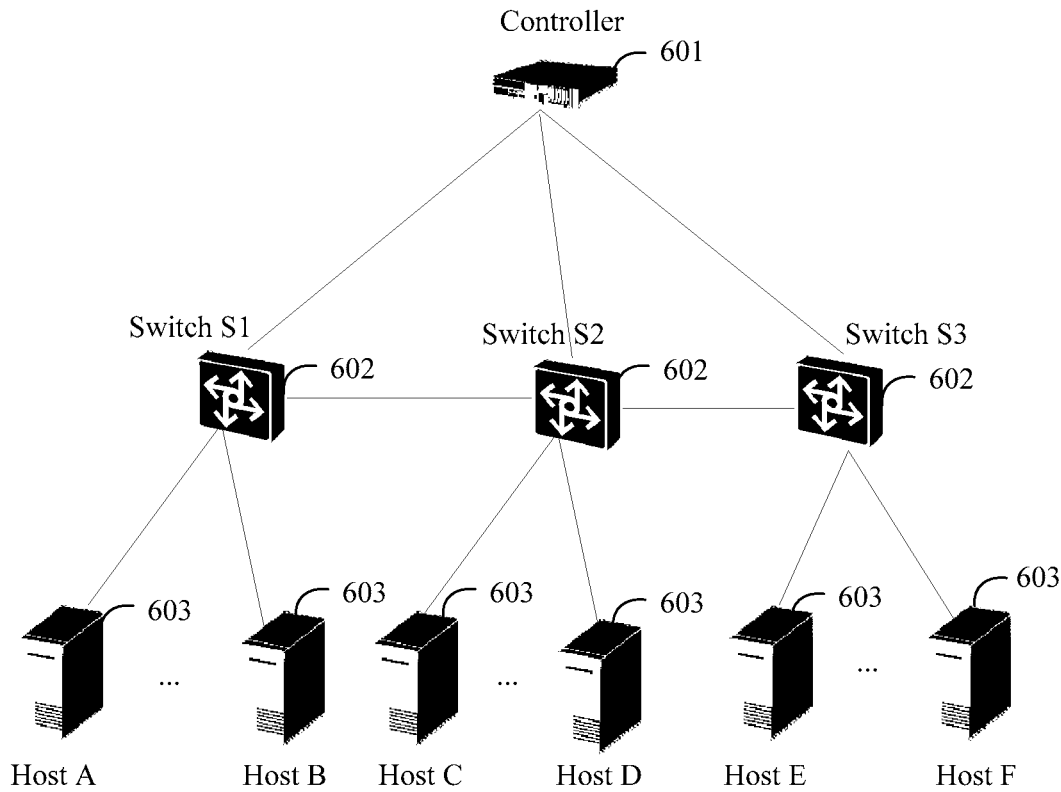
FIG. 6 is a diagram of an ARP implementation system according to an embodiment of the present disclosure.

In an SDN-based network structure according to the embodiments of the present disclosure, ARP mapping information of all hosts in an entire network is maintained together by using a controller. As shown in FIG. 6, an ARP implementation system according to an embodiment of the present disclosure includes an OF controller (that is, a controller) 601, an OF switch (that is, a switch) 602, and a host 603.

The controller 601 is connected to multiple switches. In FIG. 6, description is provided by using an example in which the controller 601 is connected to three switches. The three switches are a switch S1, a switch S2, and a switch S3, which are represented by 602-a, 602-b, and 602-c, respectively. Each switch is connected to at least one host. In FIG. 6, description is provided by using an example in which each switch is connected to two hosts. The switch S1 is connected to a host A and a host B; the switch S2 is connected to a host C and a host D; and the switch S3 is connected to a host E and a host F. The host A, the host B, the host C, the host D, the host E, and the host F are represented by 603-a, 603-b, 603-c, 603-d, 603-e, and 603-f, respectively.

The controller 601 is a control plane device in an SDN network architecture, and is responsible for determining a forwarding action of a service flow according to a packet characteristic, forming a corresponding flow table rule, delivering the corresponding flow table rule to the switch 602, and maintaining ARP mapping information of the host 603 together.

For example, the ARP mapping information may be uniformly recorded on the controller 601 in a form of an ARP mapping table. The controller 601 maintains one ARP entry for each host, and the ARP entry records a mapping relationship between an IP address and a MAC address of the host.

The switch 602 is a user plane device in the SDN network architecture, and is configured to: obtain the flow table rule from the controller 601 and store the flow table rule, and perform, according to the forwarding action recoded in the stored flow table rule, a corresponding action on a packet that meets the stored flow table rule, so as to implement forwarding processing of the packet.

Before sending a packet to a destination host, a source host needs to learn a MAC address of the destination host. When an ARP entry of the destination host is not locally cached, the source host sends an ARP request to a switch that is connected to the source host; the switch then encapsulates the ARP request into a packet-in message and sends the packet-in message to the controller 601; and the controller 601 determines whether to broadcast the ARP request subsequently.

The following details an SDN-based ARP implementation method according to this embodiment of the present disclosure.

In an SDN network, when receiving an ARP request message that cannot be fulfilled, a switch generates a packet-in message and reports the packet-in message to a controller. When receiving an ARP response message that cannot be processed, the switch generates a packet-in message and reports the packet-in message to the controller. In this embodiment, when the switch accesses the network, the controller preconfigures flow table rules of all switches. A configured flow table rule includes at least that when receiving an ARP request sent by an adjacent switch, a switch floods the ARP request sent by the adjacent switch.

The configured flow table rule may further include that when receiving an ARP request from a non-switch interconnect port (for example, from a host that is connected to the switch), the switch reports the ARP request from the non-switch interconnect port to the controller.

Flooding means that a switch sends, based on the Spanning Tree Protocol, a received packet by using all other ports that are different from a port from which the packet is received. That is, the switch sends, by using all other ports that are different from a port corresponding to the adjacent switch, the ARP request received from the adjacent switch. The all other ports include ports corresponding to all other switches that are adjacent to the switch and ports corresponding to all hosts that are connected to the switch.

As shown in FIG. 6, for example, the switches S1 and S3 are adjacent to the switch S2, and the host C and the host D are connected to the switch S2. When the switch S2 receives an ARP request forwarded by the switch S1, the S2 forwards the ARP request to all other ports that are different from a port that receives the ARP request, that is, the S2 forwards the ARP request to the S3 that is different from the S1, and to the host C and the host D.

Embodiment 1

Figure 7:
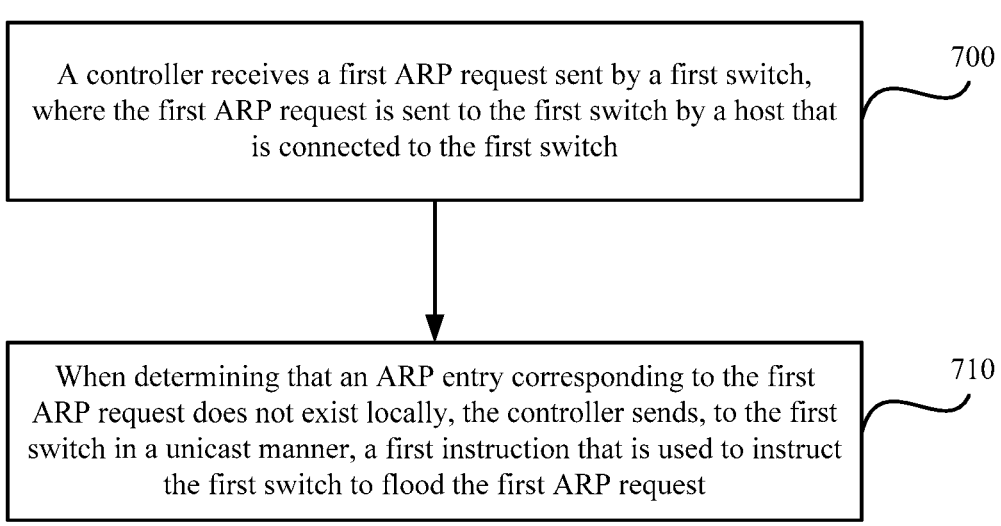
FIG. 7 is a flowchart of an SDN-based ARP implementation method according to Embodiment 1 of the present disclosure.

As shown in FIG. 7, in an example in which a switch (assumed to be a first switch) sends an ARP request, a process of an SDN-based ARP implementation method in Embodiment 1 of the present disclosure is specifically as follows.

Step 700: A controller receives a first ARP request sent by a first switch, where the first ARP request is sent to the first switch by a host that is connected to the first switch.

Specifically, because the first ARP request received by the first switch is sent by the host that is connected to the first switch, the first switch encapsulates the first ARP request into a packet-in message and reports the packet-in message to the controller according to a flow table rule preconfigured by the controller for the first switch. For example, the first switch may add a packet of the first ARP request to the packet-in message and report the packet-in message to the controller.

The controller locally stores an ARP entry corresponding to a host (also referred to as a source host) that reports the first ARP request, that is, stores a mapping relationship between an IP address and a MAC address of the source host into the corresponding ARP entry.

The first ARP request includes an IP address of a host that the source host desires to communicate with (also referred to as a destination host), that is, a destination IP address.

Step 710: When determining that an ARP entry corresponding to the first ARP request does not exist locally, the controller sends, to the first switch, a first instruction configured to instruct the first switch to flood the first ARP request.

The first instruction is configured to instruct the first switch to send the first ARP request to both a switch that is adjacent to the first switch and the host that is connected to the first switch.

In Embodiment 1 in accordance with the present disclosure, the controller maintains ARP mapping entries of all hosts in an entire network together. After receiving the packet-in message that carries the first ARP request and that is sent by the first switch, the controller parses the packet-in message to obtain the first ARP request, and checks whether the ARP entry corresponding to the first ARP request exists locally, that is, checks whether a destination MAC address corresponding to the destination IP address exists locally. If the ARP entry corresponding to the first ARP request does not exist locally, the controller sends a packet-out message to the first switch in a unicast manner. The packet-out message is configured to instruct the first switch to flood the first ARP request.

Specifically, after the first switch floods the first ARP request, the switch that is adjacent to the first switch receives the first ARP request forwarded by the first switch, and the adjacent switch continues to flood the first ARP request according to a preconfigured flow table rule of the adjacent switch. In addition, the host that is connected to the first switch receives the first ARP request forwarded by the first switch. If determining that the destination IP address included in the first ARP request matches an IP address of the host, the host returns an ARP response to the first switch; or if determining that the destination IP address included in the first ARP request does not match the IP address of the host, the host does not return an ARP response.

In the foregoing process, when determining that the ARP entry corresponding to the first ARP request does not exist locally, the controller instructs the first switch that sends the first ARP request to flood the first ARP request; and the switch that is adjacent to the first switch continues to flood the first ARP request according to a preconfigured flow table rule of each switch. In this way, the first ARP request can be broadcast to the entire network by means of message forwarding between switches. Because the first ARP request does not need to be encapsulated into the packet-in message when the first ARP request is forwarded between the switches, and the controller sends the packet-out message to only the first switch, a quantity of times for sending the packet-out message is greatly reduced, and processing load on the controller is reduced. Therefore, fewer network transmission resources are occupied for broadcasting an ARP request, and efficiency of broadcasting the ARP request can be improved. In addition, a flow table rule of a switch is preset, so as to avoid that in a process of broadcasting the ARP request, a switch generates the packet-in message again and repeatedly reports the packet-in message to the controller when the switch receives the ARP request forwarded by an adjacent switch.

Further, when receiving the first ARP request, a host checks whether the first ARP request is used to query for a MAC address corresponding to an IP address of the host. If a host (that is, the destination host) finds that the first ARP request matches an IP address of the host, the host returns an ARP response (which may be denoted as a first ARP response) to a connected switch; and the connected switch encapsulates the first ARP response into a packet-in message and sends the packet-in message to the controller.

When the controller receives a packet-in message that carries the first ARP response and that is returned by a switch (which may be the first switch or another switch), the controller converts the packet-in message to a corresponding packet-out message that carries the first ARP response, and sends the packet-out message to the first switch in a unicast manner. The first switch feeds back the first ARP response to the host that sends the first ARP request (that is, the source host), and the controller locally stores an ARP entry in the first ARP response. In a subsequent communication process, the source host may send a packet to the destination host according to a MAC address of the destination host in the first ARP response.

In addition, after receiving the packet-in message that carries the first ARP request and that is sent by the first switch, the controller checks whether the ARP entry corresponding to the first ARP request exists locally. If determining that the ARP entry corresponding to the first ARP request exists, the controller determines, according to the ARP entry, the destination host and a destination switch that is connected to the destination host, and sends the first ARP request to the destination switch.

Specifically, the controller determines, according to a locally stored ARP mapping table, the ARP entry corresponding to the first ARP request. The ARP entry includes a mapping relationship between a destination IP address and a destination MAC address. In this case, the controller does not directly feed back the ARP entry to the first switch, but forwards the first ARP request to the destination host according to the destination MAC address by using the destination switch that is connected to the destination host.

There are two cases after the controller forwards the first ARP request to the destination host by using the destination switch.

Case 1:

If a second ARP response returned by the destination switch is received, the controller forwards the second ARP response to the first switch.

If the second ARP response returned by the destination switch is received, it indicates that the ARP entry corresponding to the first ARP request and that is stored by the controller matches information about a latest IP address and the MAC address of the destination host, that is, the original IP address and MAC address of the destination host keep unchanged.

Specifically, the controller receives a packet-in message that carries the second ARP response and that is sent by the destination switch. The packet-in message is obtained by encapsulating the second ARP response by the destination switch after the destination switch receives the second ARP response sent by the destination host. When receiving the packet-in message that carries the second ARP response, the controller converts the packet-in message into a packet-out message that carries the second ARP response, and sends the packet-out message to the first switch in a unicast manner. The first switch feeds back the second ARP response to the host that sends the first ARP request.

Case 2:

If an ARP response returned by the destination switch is not received in specified duration, the controller deletes the ARP entry corresponding to the first ARP request and that is stored locally, and sends, to the first switch, a second instruction configured to instruct the first switch to flood the first ARP request. The second instruction is configured to instruct the first switch to send the first ARP request to both the switch that is adjacent to the first switch and the host that is connected to the first switch.

If the ARP response returned by the destination switch is not received in the specified duration, it indicates that the ARP entry corresponding to the first ARP request and that is stored by the controller does not match information about a latest IP address and the MAC address of the destination host, that is, the IP address of the destination host has changed. The ARP entry corresponding to the first ARP request and that is stored locally by the controller becomes invalid, and therefore, the corresponding ARP entry is deleted.

In this case, the controller continues to initiate ARP broadcast, to obtain a correct destination host corresponding to the first ARP request and a switch that is connected to the correct destination host.

Specifically, the controller sends the packet-out message to the first switch in a unicast manner. The packet-out message instructs the first switch to flood the first ARP request, that is, instructs the first switch to forward the first ARP request to the adjacent switch and the connected host. The adjacent switch receives the first ARP request, and continues to flood the first ARP request according to the preconfigured flow table rule. In addition, the host that is connected to the first switch receives the first ARP request forwarded by the first switch. If determining that the destination IP address included in the first ARP request matches the IP address of the host, the host returns an ARP response to the first switch; otherwise, the host does not return an ARP response. In this way, the first ARP request can be broadcast to the entire network by means of message forwarding between adjacent switches.

After the controller broadcasts the first ARP request, a host (assumed to be a host C) finds that the destination IP address included in the first ARP request matches an IP address of the host, and returns a third ARP response to a connected second switch (assumed to be a switch S2); and the second switch encapsulates the third ARP response into a packet-in message and sends the packet-in message to the controller.

Further, after receiving the third ARP response sent by the second switch, the controller locally stores an ARP entry included in the third ARP response that is sent by the second switch, and forwards the third ARP response to the first switch.

Specifically, the controller receives the packet-in message that carries the third ARP response and that is sent by the second switch. The packet-in message is obtained by encapsulating the third ARP response by the second switch after the second switch receives the third ARP response sent by the host C. When receiving the packet-in message that carries the third ARP response, the controller converts the packet-in message into a packet-out message that carries the third ARP response, and sends the packet-out message to the first switch in a unicast manner. The first switch feeds back the third ARP response to the host that sends the first ARP request.

In the foregoing process, when the ARP entry corresponding to the first ARP request exists locally, the controller sends the first ARP request to the destination switch in a unicast manner; and if an ARP response is received, feeds back the ARP response to the first switch in a unicast manner, so that the first switch further feeds back the ARP response to a source host; or if no ARP response is received in specified duration, locally deletes the corresponding ARP entry, and broadcasts the first ARP request by means of message forwarding between switches, so as to obtain a correct MAC address that is of a destination host and corresponding to the destination IP address in the first ARP request, and locally update the ARP entry. In this way, an ARP table stored by the controller can be updated in a timely manner, avoiding a more serious network error caused by an invalid ARP entry stored by the controller.

The above is the SDN-based ARP implementation method according to Embodiment 1 of the present disclosure.

Embodiment 2

Figure 8A:
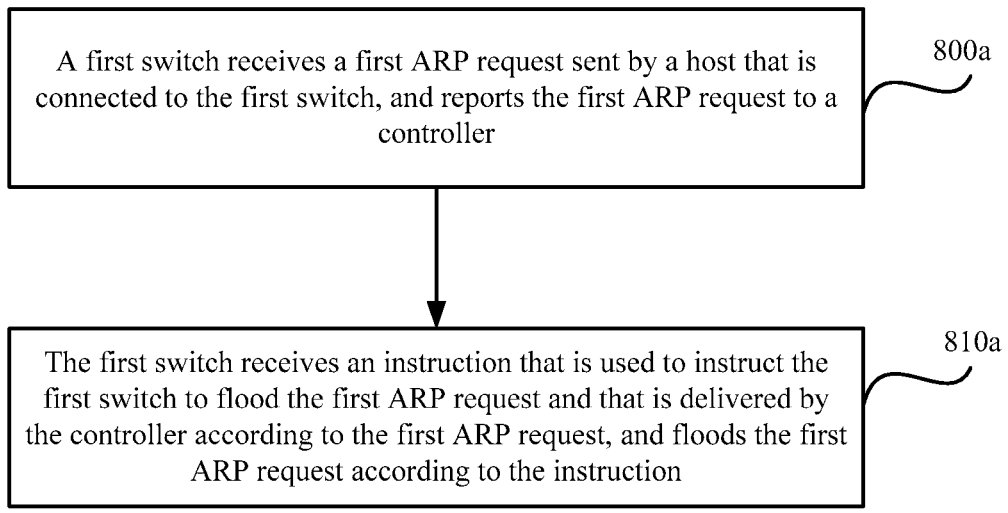
FIG. 8a is a flowchart of another SDN-based ARP implementation method according to Embodiment 2 of the present disclosure.

Based on a same inventive concept, Embodiment 2 of the present disclosure provides another SDN-based ARP implementation method. The following still uses a first switch as an example for description. A specific process is shown in FIG. 8a.

Step 800a: A first switch receives a first ARP request sent by a host that is connected to the first switch, and reports the first ARP request to a controller.

The first switch performs configuration on a flow table rule according to a flow table rule configuration command delivered by the controller.

The flow table rule includes that when receiving an ARP request from a non-switch interconnect port (for example, from a host that is connected to a switch), the switch reports the ARP request from the non-switch interconnect port to the controller.

Step 810a: The first switch receives an instruction configured to instruct the first switch to flood the first ARP request and that is delivered by the controller according to the first ARP request, and floods the first ARP request according to the instruction.

Specifically, the first switch sends, according to the instruction, the first ARP request to both a switch that is adjacent to the first switch and the host that is connected to the first switch.

The instruction is sent by the controller to the first switch in a unicast manner when the controller determines that an ARP entry corresponding to the first ARP request does not exist locally.

Alternatively, the instruction is sent by the controller to the first switch in a unicast manner when the controller determines that an ARP entry corresponding to the first ARP request exists locally, sends the first ARP request to the destination switch in a unicast manner, but does not receive, after the first ARP request is sent to a destination host by using the destination switch, an ARP response returned by the destination host by using the destination switch.

Specifically, like the first switch, all switches in the entire network perform, according to the flow table rule configuration command delivered by the controller, configuration on the flow table rule in advance when accessing a network. In this way, when the switch that is adjacent to the first switch receives the first ARP request forwarded by the first switch, the switch directly forwards the first ARP request to a connected host and all other adjacent switches that are different from the first switch. Therefore, the first ARP request can be broadcast by means of message forwarding between switches.

Further, when a host corresponding to a destination IP address that is included in the first ARP request receives the first ARP request sent by a switch that is connected to the host, the host returns an ARP response to the connected switch. The connected switch encapsulates the ARP response into a packet-in message and reports the packet-in message to the controller. The controller processes the ARP response, and sends the ARP response to the first switch in a unicast manner by using a packet-out message. The first switch feeds back the ARP response to the host that sends the first ARP request. In this way, in a subsequent communication process, the host that sends the first ARP request can send a packet to the destination host based on an ARP entry included in the ARP response.

Embodiment 3

Figure 8B:
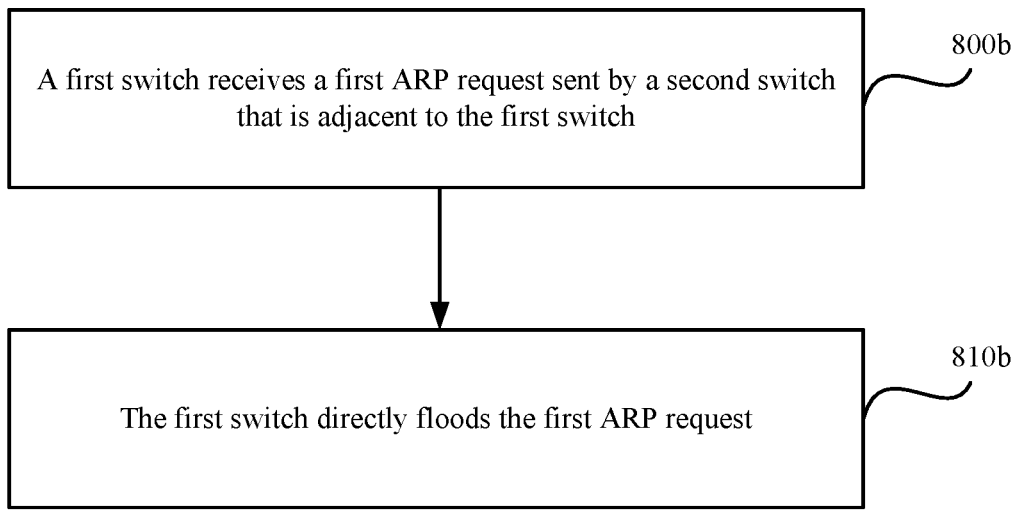
FIG. 8b is a flowchart of another SDN-based ARP implementation method according to Embodiment 3 of the present disclosure.

Based on a same inventive concept, Embodiment 3 of the present disclosure provides another SDN-based ARP implementation method. The following still uses a first switch as an example for description. A specific process is shown in FIG. 8b.

Step 800b: A first switch receives a first ARP request sent by a second switch that is adjacent to the first switch.

Before receiving the first ARP request sent by the second switch that is adjacent to the first switch, the first switch performs configuration on a flow table rule according to a flow table rule configuration command delivered by a controller.

The flow table rule includes that when receiving an ARP request sent by an adjacent switch, a switch floods the ARP request sent by the adjacent switch, and when receiving an ARP request sent by a connected host, the switch reports, to the controller, the ARP request sent by the connected host.

Step 810b: The first switch directly floods the first ARP request.

Specifically, the first switch sends the first ARP request to a switch that is different from the second switch and that is adjacent to the first switch, and a host that is connected to the first switch.

The following further describes this embodiment of the present disclosure in detail with reference to FIG. 6 and specific application scenarios.

Embodiment 4

Before communicating with a destination host, the host A needs to obtain a destination MAC address according to a destination IP address by using the ARP protocol. In Embodiment 4, the host A is connected to the switch S1, the host E is connected to the switch S3, the switch S2 is adjacent to the switch S1 and the switch S3, and the switch S1 is not adjacent to the switch S3.

The following details an ARP implementation process in Embodiment 4 of the present disclosure in two scenarios.

Scenario 1: An ARP entry corresponding to the destination IP address does not exist on the controller locally.

Figure 9:
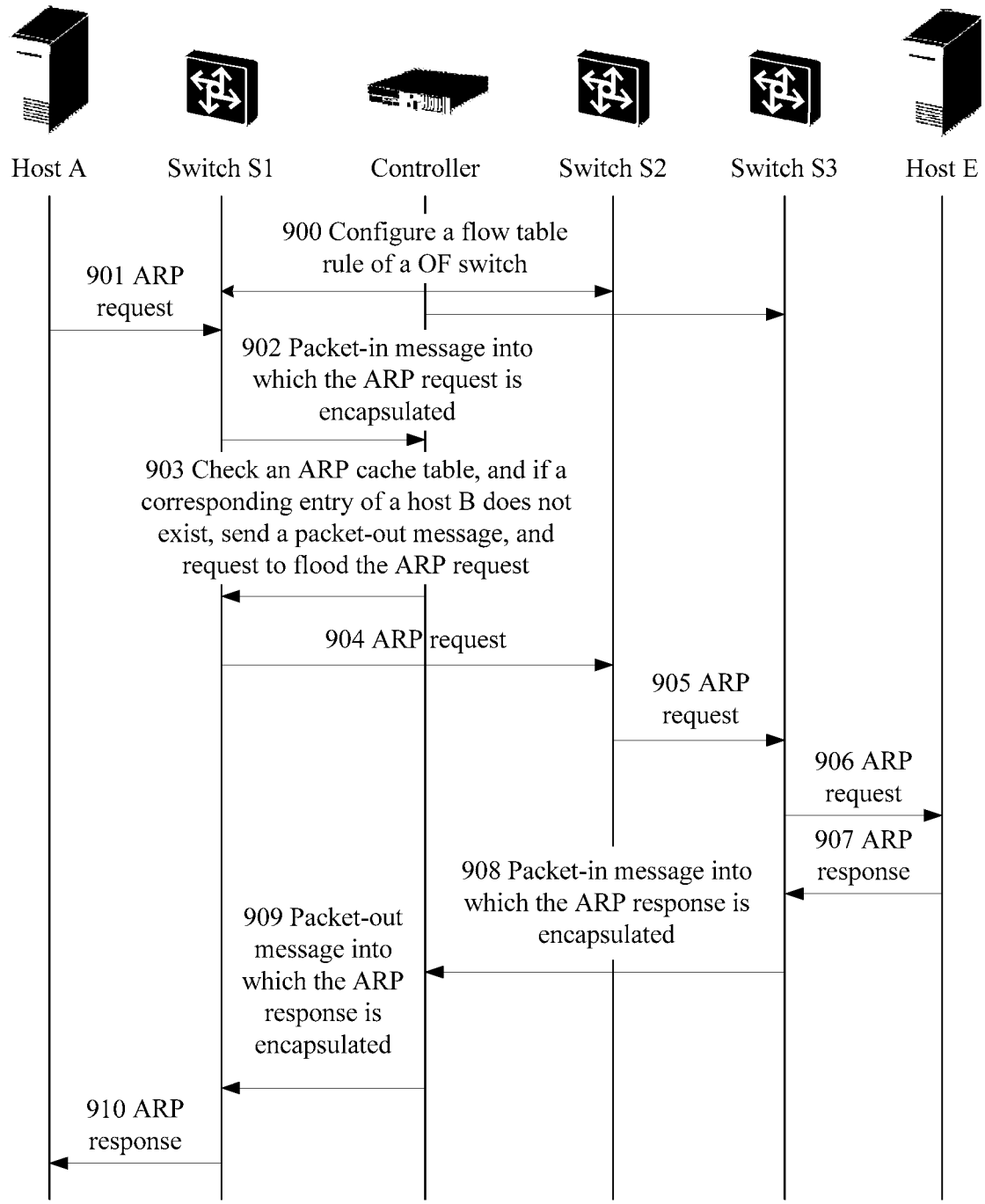
FIG. 9 is a flowchart of ARP implementation in scenario 1 according to Embodiment 4 of the present disclosure.

Referring to FIG. 9, an ARP implementation process in the scenario 1 is as follows.

Step 900: When a switch accesses a network, a controller preconfigures a flow table rule of the switch.

The configured flow table rule includes that when receiving an ARP request from a non-switch interconnect port (for example, from a host that is connected to the switch), the switch reports the ARP request from the non-switch interconnect port to the controller; and when receiving an ARP request sent by an adjacent switch, the switch floods the ARP request sent by the adjacent switch.

Step 901: The host A sends an ARP request to the connected switch S1.

The ARP request includes an IP address of a host that the host A desires to communicate with (that is, the destination host), and the IP address is the destination IP address.

Step 902: The switch S1 encapsulates the ARP request into a packet-in message, and reports the packet-in message to the controller.

Because the ARP request is from a non-switch interconnect port, when receiving the ARP request, the switch S1 reports the ARP request to the controller according to a preconfigured flow table rule.

Step 903: The controller checks a local ARP cache table, and if determining that an ARP entry corresponding to the destination IP address does not exist, sends a packet-out message to the switch S1 in a unicast manner, to instruct the switch S1 to flood the ARP request.

Step 904: In a process of flooding the ARP request, the switch S1 sends the ARP request to an adjacent switch (for example, the switch S2).

In addition, the switch S1 also sends the ARP request to connected hosts (for example, the host A and the host B).

Step 905: In a process of flooding the ARP request, the switch S2 sends the ARP request to the switch S3.

Specifically, when receiving the ARP request, the switch S2 sends, according to a preconfigured flow table rule of the switch S2, the ARP request to both an adjacent switch that is different from the switch S1 (for example, the switch S3) and a connected host (for example, the host C or the host D).

Step 906: In a process of flooding the ARP request, the switch S3 sends the ARP request to a connected host (for example, the host E).

Likewise, when receiving the ARP request, the switch S3 sends, according to a preconfigured flow table rule of the switch S3, the ARP request to both a connected host and an adjacent switch that is different from the switch 2.

Assuming that the host corresponding to the destination IP address, that is, the destination host, is the host E, step 907 is executed.

Step 907: The host E returns an ARP response to the switch S3.

Step 908: The switch S3 encapsulates the ARP response into a packet-in message and sends the packet-in message to the controller.

Step 909: The controller converts the packet-in message that carries the ARP response into a packet-out message that carries the ARP response, and sends, to the switch S1 in a unicast manner, the packet-out message that carries the ARP response.

Step 910: The switch S1 parses the packet-out message that carries the ARP response, and sends the ARP response to the host A in a unicast manner.

In a subsequent communication process, the host A may perform communication according to a destination MAC address included in the ARP response.

Scenario 2: An ARP entry corresponding to the destination IP address exists on the controller locally.

Figure 10:
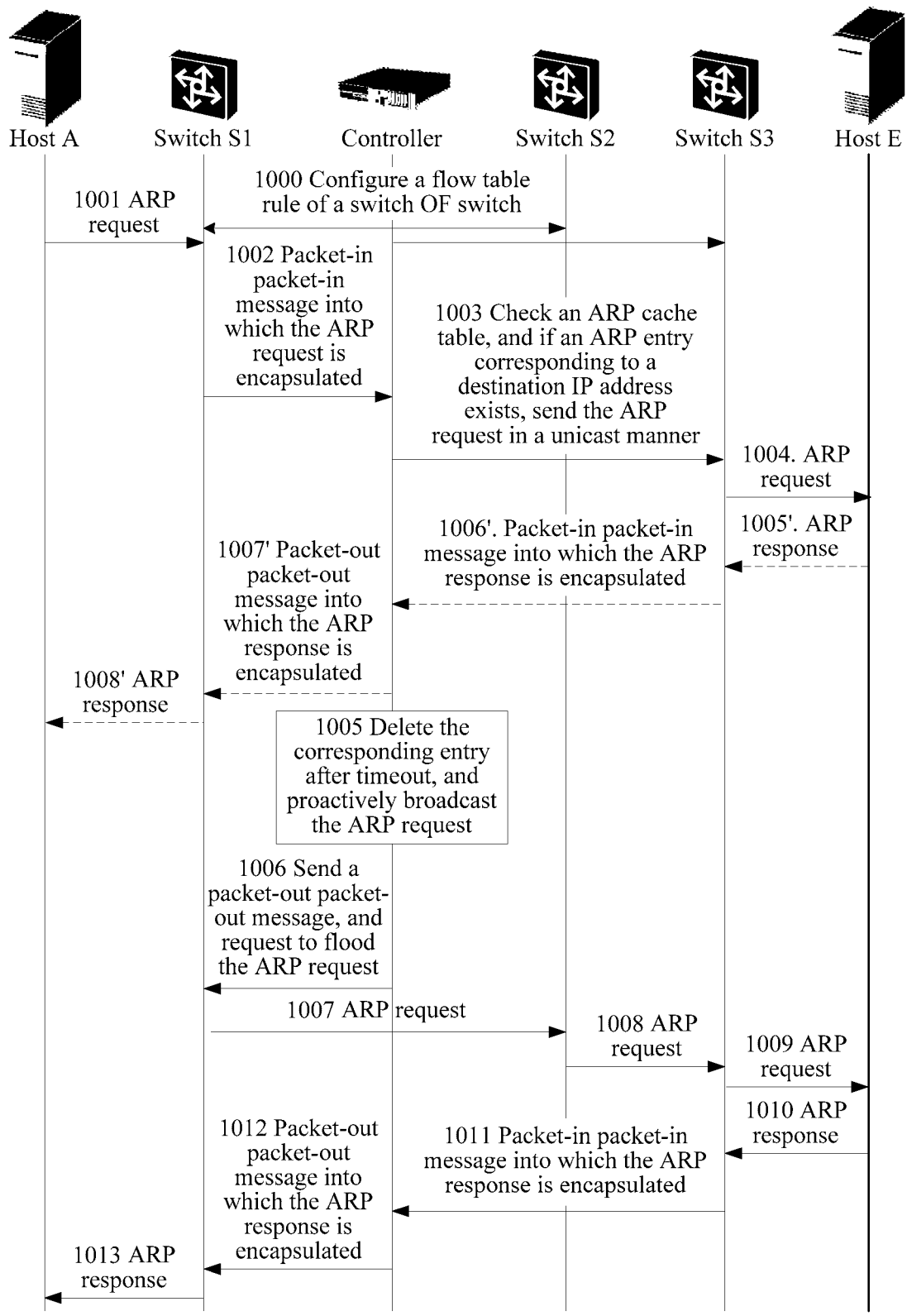
FIG. 10 is a flowchart of ARP implementation in scenario 2 according to Embodiment 4 of the present disclosure.

Referring to FIG. 10, an ARP implementation process in the scenario 2 is as follows.

Step 1000: When a switch accesses a network, a controller preconfigures a flow table rule of the switch.

The configured flow table rule includes at least that when receiving an ARP request from a non-switch interconnect port (for example, from a host that is connected to the switch), the switch reports the ARP request from the non-switch interconnect port to the controller; and when receiving an ARP request sent by an adjacent switch, the switch floods the ARP request sent by the adjacent switch.

Step 1001: The host A sends an ARP request to the connected switch S1.

The ARP request includes an IP address of a host that the host A desires to communicate with (that is, the destination host), and the IP address is the destination IP address.

Step 1002: The switch S1 encapsulates the ARP request into a packet-in message, and reports the packet-in message to the controller.

When receiving the ARP request, the switch S1 reports the ARP request to the controller according to a preconfigured flow table rule.

Step 1003: The controller checks a local ARP cache table. If determining that an ARP entry corresponding to the destination IP address exists, the controller determines a destination switch (that is, the switch S3) that is connected to the destination host (assumed to be the host E), encapsulates the ARP request into a packet-out message, and sends the packet-out message to the switch S3 in a unicast manner.

Step 1004: The switch S3 sends the ARP request in a unicast manner to a port corresponding to the host E.

After receiving the ARP request, the host E matches a destination IP address in the ARP request with a local latest IP address. The following process has two different situations according to a matching result. If the destination IP address in the ARP request matches the local latest IP address, steps 1005' to 1008' are executed; or if the destination IP address in the ARP request does not match the local latest IP address, steps 1005 to 1012 are executed.

Step 1005': The host E returns an ARP response to the switch S3.

Step 1006': The switch S3 encapsulates the ARP response into a packet-in message and sends the packet-in message to the controller.

Step 1007': The controller converts the packet-in message that carries the ARP response into a packet-out message that carries the ARP response, and sends, to the switch S1 in a unicast manner, the packet-out message that carries the ARP response.

Step 1008': The switch S1 parses the packet-out message that carries the ARP response, and sends the ARP response to the host A in a unicast manner.

In a subsequent process, the host A may perform communication according to a destination MAC address included in the ARP response.

Step 1005: If the controller does not receive an ARP response after specific duration, the controller deletes the ARP entry corresponding to the destination IP and that is stored locally, and step 1006 is executed.

Step 1006: The controller sends the packet-out message to the switch S1 in a unicast manner, where the packet-out message is configured to instruct the switch S1 to flood the ARP request.

Step 1007 to step 1013 are the same as step 904 to step 910 in the scenario 1, and same details are not repeatedly described.

Embodiment 5

Figure 11:
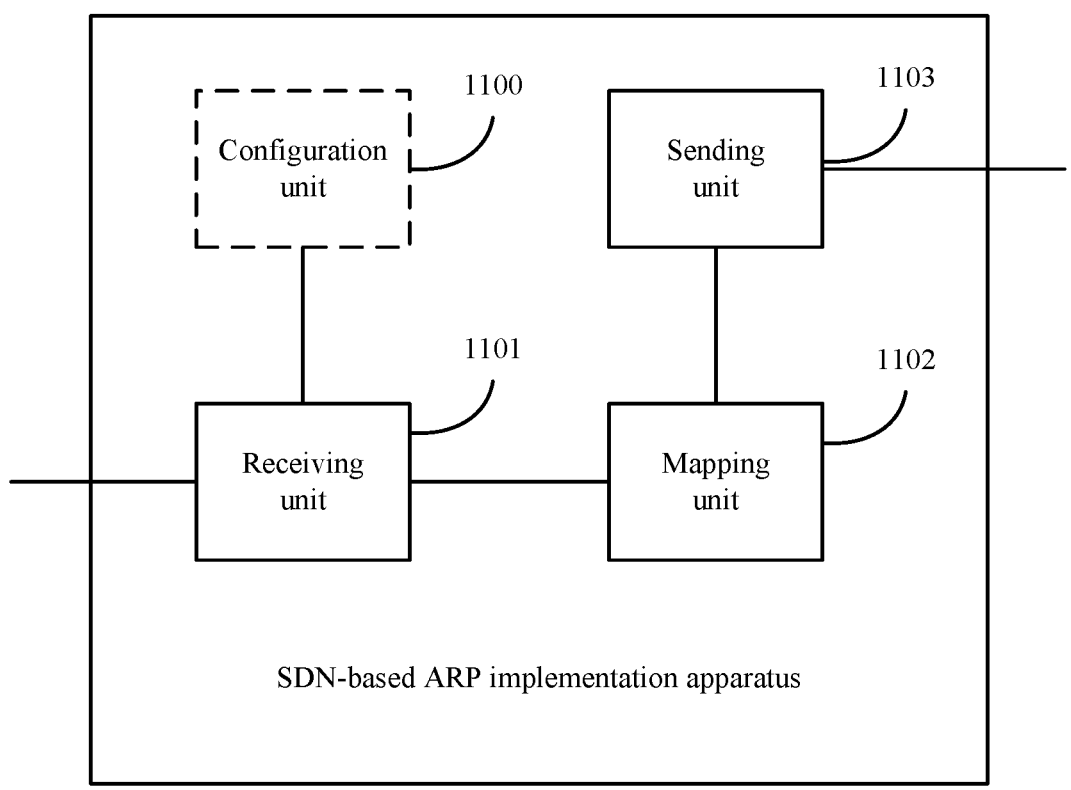
FIG. 11 is a structural diagram of an SDN-based ARP implementation apparatus according to Embodiment 5 of the present disclosure.

Based on a same inventive concept, referring to FIG. 11, Embodiment 5 of the present disclosure provides an SDN-based ARP implementation apparatus, including:

a receiving unit 1101, configured to receive a first ARP request sent by a first switch, where the first ARP request is sent to the first switch by a host that is connected to the first switch;

a mapping unit 1102, configured to determine whether an ARP entry corresponding to the first ARP request received by the receiving unit 1101 exists locally; and a sending unit 1103, configured to: when the mapping unit 1102 determines that the ARP entry corresponding to the first ARP request exists locally, send, to the first switch, a first instruction configured to instruct the first switch to flood the first ARP request.

With reference to Embodiment 5, in a first possible implementation, the first instruction is configured to instruct the first switch to send the first ARP request to both a switch that is adjacent to the first switch and the host that is connected to the first switch.

With reference to Embodiment 5 or the first possible implementation of Embodiment 5, in a second possible implementation, the apparatus further includes:

a configuration unit, configured to: before the receiving unit 1101 receives the first ARP request sent by the first switch, configure a preset flow table rule for the first switch, where the flow table rule includes that when receiving an ARP request sent by an adjacent switch, a switch floods the ARP request sent by the adjacent switch.

With reference to any one of Embodiment 5, or the first to the second possible implementations of Embodiment 5, in a third possible implementation, the receiving unit 1101 is further configured to: after the sending unit 1103 sends the first instruction to the first switch, receive a first ARP response;

the sending unit 1103 is further configured to forward, to the first switch, the first ARP response received by the receiving unit 1101; and the mapping unit 1102 is further configured to locally store an ARP entry in the first ARP response received by the receiving unit 1101.

With reference to any one of Embodiment 5, or the first to the third possible implementations of Embodiment 5, in a fourth possible implementation, the mapping unit 1102 is further configured to: if determining that the ARP entry corresponding to the first ARP request exists locally, determine a destination switch based on the ARP entry; and the sending unit 1103 is further configured to send the first ARP request to the destination switch determined by the mapping unit 1102.

With reference to the fourth possible implementation of Embodiment 5, in a fifth possible implementation, after the sending unit 1103 sends the first ARP request to the destination switch, if the receiving unit 1101 receives a second ARP response returned by the destination switch, the sending unit 1103 forwards the second ARP response to the first switch; or if the receiving unit 1101 does not receive, in specified duration, an ARP response returned by the destination switch, the mapping unit 1102 deletes the ARP entry corresponding to the first ARP request and that is stored locally, and the sending unit 1103 sends, to the first switch, a second instruction configured to instruct the first switch to flood the first ARP request, where the second instruction is configured to instruct the first switch to send the first ARP request to both the switch that is adjacent to the first switch and the host that is connected to the first switch.

With reference to the fifth possible implementation of Embodiment 5, in a sixth possible implementation, after the sending unit 1103 sends the second instruction to the first switch, when the receiving unit 1101 receives a third ARP response sent by a second switch, the mapping unit 1102 is further configured to locally store an ARP entry included in the third ARP response; and the sending unit 1103 is further configured to forward the third ARP response to the first switch.

Embodiment 6

Figure 12:
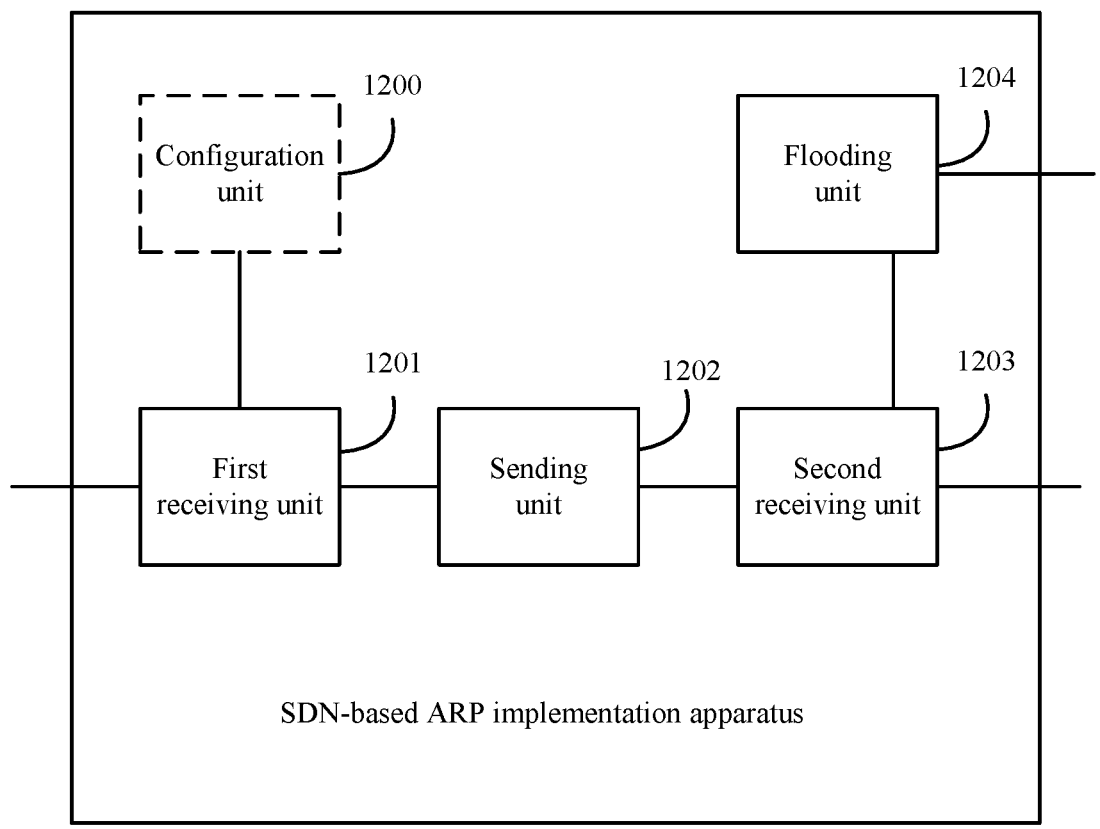
FIG. 12 is a structural diagram of an SDN-based ARP implementation apparatus according to Embodiment 6 of the present disclosure.

Based on a same inventive concept, referring to FIG. 12, Embodiment 6 of the present disclosure provides another SDN-based ARP implementation apparatus, including:

a first receiving unit 1201, configured to receive a first ARP request sent by a host that is connected to the apparatus;

a sending unit 1202, configured to report, to a controller, the first ARP request received by the first receiving unit 1201;

a second receiving unit 1203, configured to receive an instruction configured to instruct the apparatus to flood the first ARP request and that is delivered by the controller according to the first ARP request; and a flooding unit 1204, configured to flood the first ARP request according to the instruction received by the second receiving unit 1203.

With reference to Embodiment 6, in a first possible implementation, the flooding unit 1204 is specifically configured to:

send the first ARP request to both a switch that is adjacent to the apparatus and the host that is connected to the apparatus.

With reference to Embodiment 6 or the first possible implementation of Embodiment 6, in a second possible implementation, the apparatus further includes:

a configuration unit 1200, configured to: before the first receiving unit 1201 receives the first ARP request sent by the host that is connected to the apparatus, perform configuration on a flow table rule according to a flow table rule configuration command delivered by the controller, where the flow table rule includes that when receiving an ARP request sent by an adjacent switch, a switch floods the ARP request sent by the adjacent switch.

Embodiment 7

Figure 13:
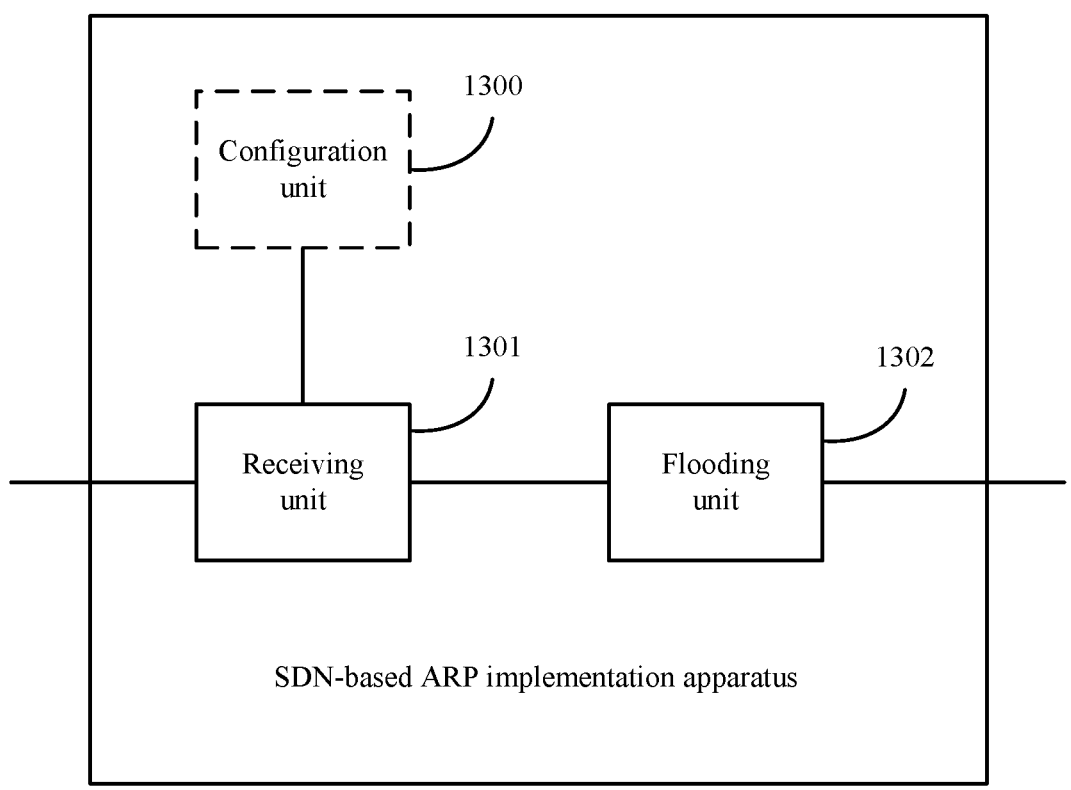
FIG. 13 is a structural diagram of an SDN-based ARP implementation apparatus according to Embodiment 7 of the present disclosure.

Based on a same inventive concept, referring to FIG. 13, Embodiment 7 of the present disclosure provides another SDN-based ARP implementation apparatus, including:

a receiving unit 1301, configured to receive a first ARP request sent by a second switch that is adjacent to the apparatus; and a flooding unit 1302, configured to directly flood the first ARP request received by the receiving unit 1301.

With reference to Embodiment 7, in a first possible implementation, the flooding unit 1302 is specifically configured to:

send the first ARP request to a switch that is different from the apparatus and that is adjacent to the apparatus, and a host that is connected to the apparatus.

With reference to Embodiment 7 or the first possible implementation of Embodiment 7, in a second possible implementation, the apparatus further includes:

a configuration unit 1300, configured to: before the receiving unit 1301 receives the first ARP request sent by the second switch that is adjacent to the first switch, perform configuration on a flow table rule according to a flow table rule configuration command delivered by a controller, where the flow table rule includes that when receiving an ARP request sent by an adjacent switch, a switch floods the ARP request sent by the adjacent switch, and when receiving an ARP request sent by a connected host, the switch reports, to the controller, the ARP request sent by the connected host.

Embodiment 8

Figure 14:
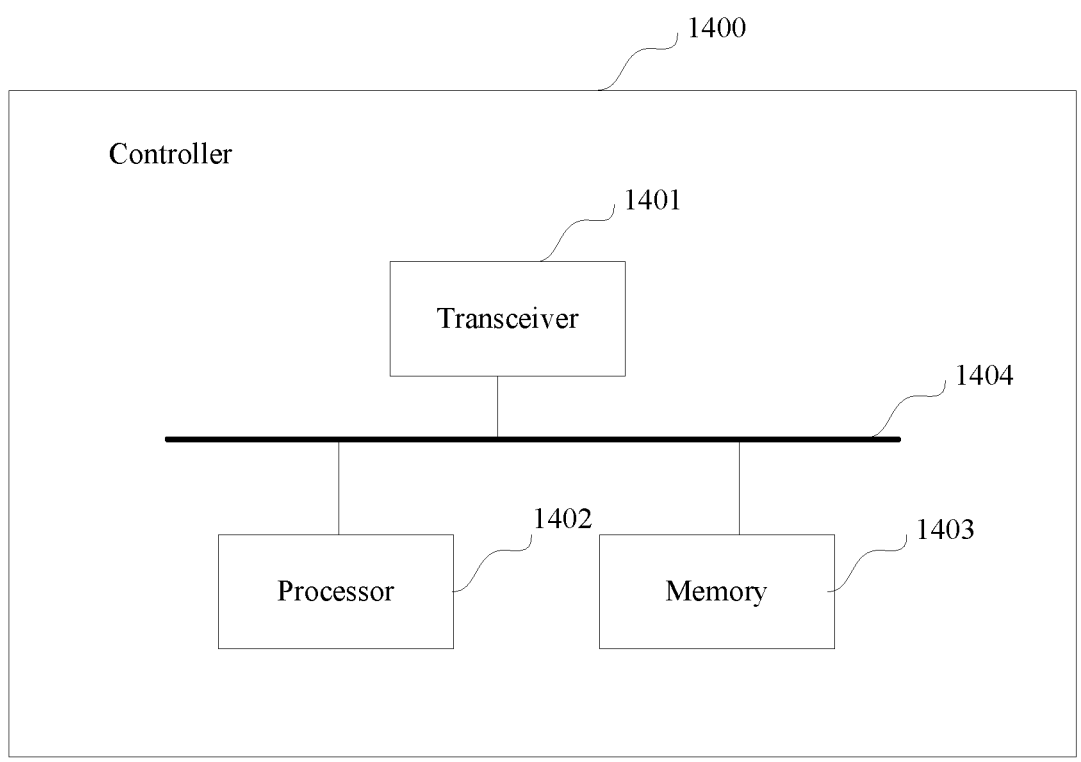
FIG. 14 is a structural diagram of a controller according to Embodiment 8 of the present disclosure.

Based on a same inventive concept, referring to FIG. 14, Embodiment 8 of the present disclosure provides a controller 1400, including a transceiver 1401, a processor 1402, a memory 1403, and a bus 1404. The transceiver 1401, the processor 1402, and the memory 1403 are connected to the bus 1404. The memory 1403 stores a set of programs, and the processor 1402 is configured to invoke the programs stored in the memory 1403, so that the controller 1400 executes the method according to Embodiment 1 of the present disclosure.

Embodiment 9

Figure 15:
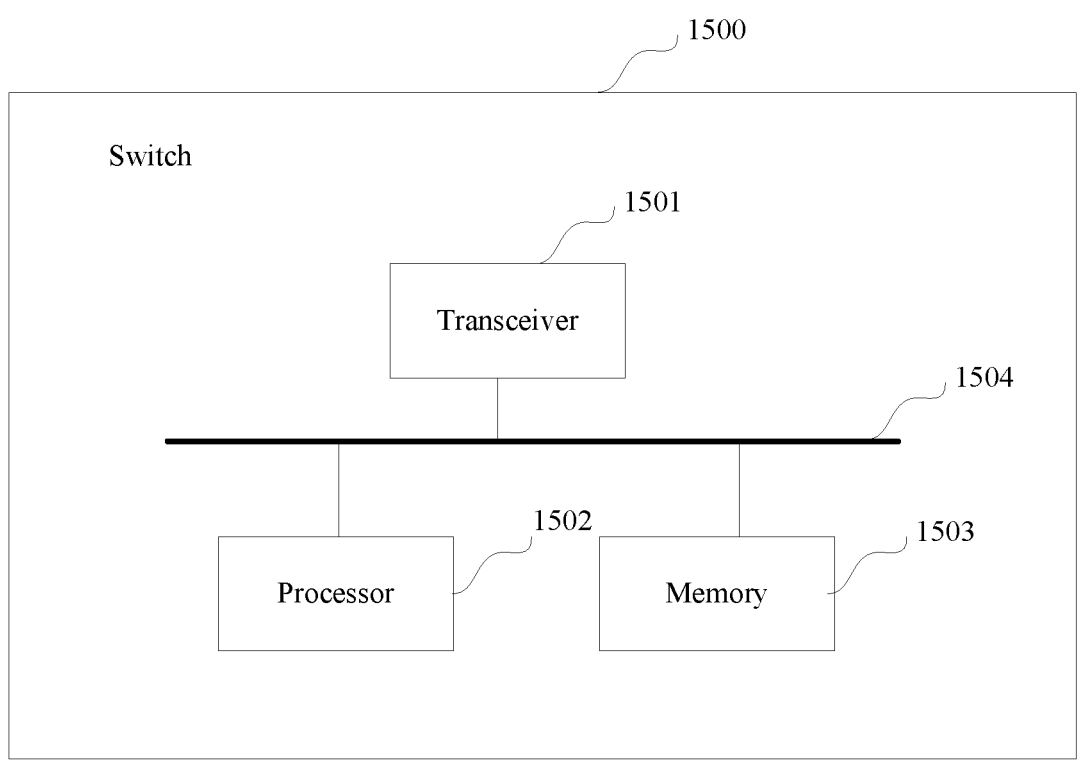
FIG. 15 is a structural diagram of a switch according to Embodiment 9 of the present disclosure.

Based on a same inventive concept, referring to FIG. 15, Embodiment 9 of the present disclosure provides a switch 1500, including a transceiver 1501, a processor 1502, a memory 1503, and a bus 1504. The transceiver 1501, the processor 1502, and the memory 1503 are connected to the bus 1504. The memory 1503 stores a set of programs, and the processor 1502 is configured to invoke the programs stored in the memory 1503, so that the switch 1500 executes the method according to Embodiment 2 of the present disclosure.

Embodiment 10

Figure 16:
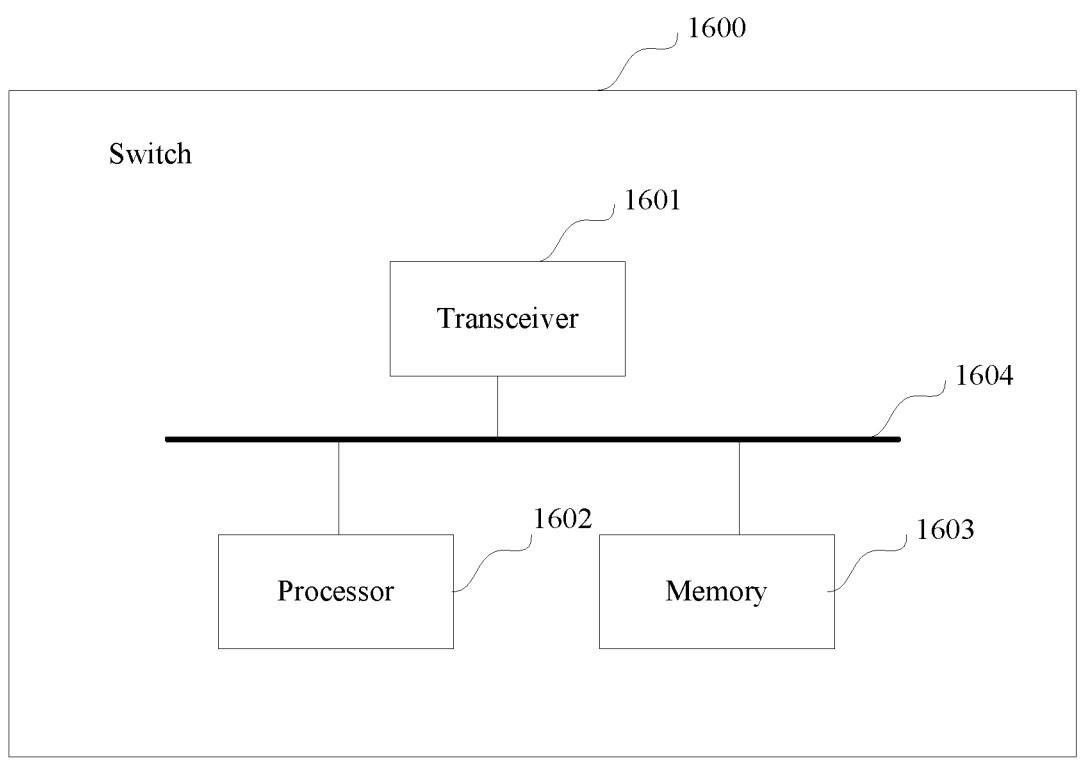
FIG. 16 is a structural diagram of a switch according to Embodiment 10 of the present disclosure.

Based on a same inventive concept, referring to FIG. 16, Embodiment 10 of the present disclosure provides a switch 1600, including a transceiver 1601, a processor 1602, a memory 1603, and a bus 1604. The transceiver 1601, the processor 1602, and the memory 1603 are connected to the bus 1604. The memory 1603 stores a set of programs, and the processor 1602 is configured to invoke the programs stored in the memory 1603, so that the switch 1600 executes the method according to Embodiment 3 of the present disclosure.

To sum up, in the embodiments of the present disclosure, the controller receives the ARP request sent by the first switch, and when determining that the ARP entry corresponding to the ARP request does not exist locally, sends, to the first switch, the instruction configured to instruct the first switch to flood the ARP request. In this way, the ARP request can be broadcast to the entire network by means of message forwarding between switches. In comparison with that the controller sends a packet-out message to a switch, fewer network transmission resources are occupied when a message is forwarded between the switches. Therefore, network transmission resources occupied for broadcasting the ARP request can be greatly reduced, and efficiency of broadcasting the ARP request can be improved. In addition, because a quantity of times for sending the packet-out message is reduced, processing load on the controller is reduced, avoiding a problem that the controller becomes a processing bottleneck due to relatively heavy load.

Persons skilled in the art should understand that the embodiments described herein may be provided as a method, a system, or a computer program product. Therefore, embodiments in accordance with the present disclosure may include a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. A software defined networking (SDN) based Address Resolution Protocol (ARP) implementation method, comprising:
   receiving, by a controller, a first ARP request from a first switch;
   determining, by the controller, whether an ARP entry corresponding to the first ARP request does not exist locally;
   when determining the ARP entry corresponding to the first ARP request does not exist locally, sending, by the controller, only to the first switch, a first instruction configured to instruct the first switch to flood the first ARP request;
   if determining, by the controller, that the ARP entry corresponding to the first ARP request exists locally, determining, by the controller, a destination switch based on the ARP entry, and sending the first ARP request to the destination switch;
   after sending the first ARP request to the destination switch, if an ARP response returned by the destination switch is not received within a specified duration, deleting the locally stored ARP entry corresponding to the first ARP request, and sending, to the first switch, a second instruction configured to instruct the first switch to flood the first ARP request,
   wherein the second instruction is configured to instruct the first switch to send the first ARP request to both a switch that is adjacent to the first switch and a host that is connected to the first switch.

2. The method according to claim 1, wherein the first instruction is configured to instruct the first switch to send the first ARP request to both a switch that is adjacent to the first switch and a host that is connected to the first switch.

3. The method according to claim 1, before receiving the first ARP request, further comprising:
   configuring, by the controller, a preset flow table rule for the first switch,
   wherein the flow table rule specifies that when a switch receives an ARP request from an adjacent switch, the switch floods the ARP request.

4. The method according to claim 1, after sending the first instruction, further comprising:
   receiving a first ARP response, forwarding the first ARP response to the first switch, and locally storing an ARP entry in the first ARP response.

5. The method according to claim 1, after sending the first ARP request to the destination switch, further comprising:
   if a second ARP response returned by the destination switch is received, forwarding the second ARP response to the first switch.

6. The method according to claim 5, after sending the second ARP response, further comprising:
   when receiving a third ARP response from a second switch, locally storing an ARP entry included in the third ARP response; and
   forwarding the third ARP response to the first switch.

7. A software defined networking (SDN)-based Address Resolution Protocol (ARP) implementation apparatus, comprising a transceiver, a processor, a memory, and a bus, wherein the transceiver, the processor, and the memory are connected to the bus, the memory is configured to store a set of machine readable instructions, and the processor is configured to invoke the set of machine readable instructions stored in the memory and cause the apparatus to perform a method comprising:
   receiving a first ARP request from a first switch;
   determining whether an ARP entry corresponding to the first ARP request does not exist locally;
   sending, when it is determined that the ARP entry corresponding to the first ARP request does not exist locally, only to the first switch, a first instruction configured to instruct the first switch to flood the first ARP request;
   if determining that the ARP entry corresponding to the first ARP request exists locally, determining a destination switch based on the ARP entry, and sending the first ARP request to the destination switch; and
   after sending the first ARP request to the destination switch, if an ARP response returned by the destination switch is not received within a specified duration, deleting the locally stored ARP entry corresponding to the first ARP request, and sending, to the first switch, a second instruction configured to instruct the first switch to flood the first ARP request,
   wherein the second instruction is configured to instruct the first switch to send the first ARP request to both a switch that is adjacent to the first switch and a host that is connected to the first switch.

8. The apparatus according to claim 7, wherein the first instruction is configured to instruct the first switch to send the first ARP request to both a switch that is adjacent to the first switch and a host that is connected to the first switch.

9. The apparatus according to claim 7, wherein the processor is configured to cause the apparatus to perform the method further comprising:
before receiving the first ARP request, configuring a preset flow table rule for the first switch, wherein
the flow table rule specifies that when a switch receives an ARP request from an adjacent switch, the switch floods the ARP request.

10. The apparatus according to claim 7, wherein the processor is configured to cause the apparatus to perform the method further comprising:
after sending the first instruction to the first switch, receiving a first ARP response;
sending, to the first switch, the first ARP response; and
locally storing an ARP entry in the first ARP response.

11. The apparatus according to claim 7, wherein the processor is configured to cause the apparatus—to perform the method further comprising:
after sending the second instruction to the first switch, when receiving a third ARP response from a second switch, locally storing an ARP entry comprised in the third ARP response; and
sending the third ARP response to the first switch.

12. The apparatus according to claim 7, wherein the apparatus is a controller.

13. A non-transitory computer-readable medium for storing machine readable instructions executable by one or more processors, wherein the machine readable instructions instruct the one or more processors to perform operations of:
receiving a first ARP request from a first switch;
determining whether an ARP entry corresponding to the first ARP request does not exist locally;
sending, when it is determined that the ARP entry corresponding to the first ARP request does not exist locally, only to the first switch, a first instruction configured to instruct the first switch to flood the first ARP request;
if determining that the ARP entry corresponding to the first ARP request exists locally, determining a destination switch based on the ARP entry, and sending the first ARP request to the destination switch; and
after sending the first ARP request to the destination switch, if an ARP response returned by the destination switch is not received within a specified duration, deleting the locally stored ARP entry corresponding to the first ARP request, and sending, to the first switch, a second instruction configured to instruct the first switch to flood the first ARP request, wherein the second instruction is configured to instruct the first switch to send the first ARP request to both a switch that is adjacent to the first switch and a host that is connected to the first switch.

* * * * *